United States Patent
Reichle et al.

(10) Patent No.: US 7,072,182 B2
(45) Date of Patent: Jul. 4, 2006

(54) SWITCHING ASSEMBLY

(75) Inventors: Gary A. Reichle, Dublin, OH (US);
Robert W. Baker, Westerville, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 10/707,057

(22) Filed: Nov. 18, 2003

(65) Prior Publication Data

US 2004/0256916 A1 Dec. 23, 2004

Related U.S. Application Data

(60) Provisional application No. 60/427,119, filed on Nov. 18, 2002.

(51) Int. Cl.
*H05K 7/20* (2006.01)

(52) U.S. Cl. .................. 361/704; 361/388; 257/706; 165/80.2; 363/141

(58) Field of Classification Search ............... 361/119, 361/111, 56, 704, 714–722, 707, 388; 363/27, 363/124, 71, 96, 41, 141; 257/706–707, 257/712–713; 165/80.2, 80.3, 185, 47
See application file for complete search history.

(56) References Cited

U.S. PATENT DOCUMENTS 3,955,122 A * 5/1976 Maynard et al. ............. 361/710
6,407,901 B1 * 6/2002 Casey et al. ................. 361/119

* cited by examiner

*Primary Examiner*—Rajnikant B. Patel
(74) *Attorney, Agent, or Firm*—Locke Liddell & Sapp LLP (57) ABSTRACT

A switch assembly and method includes a heat sink with two switch modules coupled thereto. Both of the switch modules are used in switching operations to make use of the entire heat sink, providing improved heat dissipation. The switch modules each have first and second switch devices, with each switch device having a gate terminal. A source voltage is applied to the switching modules and a positive portion of the source voltage is conducted through one switch device of the first switching module. A negative portion of the source voltage is conducted through one of the switching devices of the second switching module.

6 Claims, 12 Drawing Sheets

SWITCHING ASSEMBLY

CROSS REFERENCE TO RELATED APPLICATIONS

This application is a nonprovisional of U.S. Provisional Application No. 60/427,119, filed on Nov. 18, 2002, which is incorporated by reference herein.

BACKGROUND

1. Field of the Disclosure

The present invention relates generally to switching devices, and more particularly, to a solid state power switching module assembly having improved thermal performance.

2. Description of Related Art

Examples of electrical devices that have idle interconnected current paths include transformer tap switches, static voltage-ampere-reactive (VAR) compensators, and static transfer switches ("STS"). In these devices, either the power source or load are interconnected via solid state switch device modules, such as dual silicon controlled rectifier ("SCR") modules. Based on system requirements, portions of the interconnected path remain idle and become active based on the operation of the SCR modules. For example, a STS is commonly used to switch between a primary and one or more alternate power sources in the event of failure or instability of the primary source. STSs are commonly used in applications that require continuity of power, such as in hospitals, and critical processes in both industrial and commercial settings. At the heart of the STS are dual SCR modules, which are solid state switch devices that have two SCRs connected in an inverse parallel configuration to control the AC current supplied to a connected load.

A typical SCR module emits approximately 1 watt of heat per ampere of current through the device when conducting current to a connected load. Depending on the load requirements, the heat generated by the device can be well over one kilowatt. Failure to properly dissipate the heat generated by the SCR module can result in a premature failure and/or reduced performance of the SCR module. Moreover, the SCR module is typically housed inside an enclosure with other temperature sensitive electronic devices, and thus the increased heat energy generated by the SCR module can damage and/or impede the performance of surrounding electronic devices. A thermal interface, such as a heat sink, must be provided to dissipate the heat generated by the SCR module. Because of the criticality of the STS and thus the importance of having properly operating SCR modules, there is a continued focus on finding ways to more effectively dissipate the heat generated by the SCR modules and reduce the temperature rise of the heat sink.

Heretofore, methods of increasing the heat dissipating capability of the heat sink have included using aluminum heat sinks with copper portions interspersed at critical locations on the heat sink, such as that disclosed in U.S. Pat. No. 3,766,977 to Pravda et al.; the use of fans to more actively circulate the SCR module's heat energy throughout the surrounding air; and using a cooling fluid medium applied to the heat sink and/or the SCR module. Moreover, it has been thought that the heat generated by a SCR module spreads readily from the hot, active SCR module to areas of the heat sink which are occupied by inactive cooler devices.

The present application addresses these shortcomings associated with the prior art.

SUMMARY OF DISCLOSURE

In one aspect of the disclosure, a switch assembly has a heat sink with two switch modules coupled thereto. Both of the switch modules are used in switching operations to make use of the entire heat sink, providing improved heat dissipation. The switch modules each have first and second switch devices, with each switch device having a gate terminal. A first power source input terminal is connected to a cathode terminal of the second switching device of the first switch module and an anode terminal of the first switching device of the second switch module. An output terminal is connected to an anode terminal of the second switching device of the first switch module and a cathode terminal of the first switching device of the second switch module. The gate terminals of the switching devices are controllable such that the first switch module conducts during a first portion of the power duty cycle and the second switch module conducts during a second portion of the power duty cycle.

Further, a method of operating switching modules coupled to a common heat sink is disclosed. Each of the switching modules has first and second switch devices. The method includes applying a source voltage to the switching modules and conducting a positive portion of the source voltage through one switch device of the first switching module. A negative portion of the source voltage is conducted through one of the switching devices of the second switching module. For example, the positive portion of the source voltage may be conducted through the second switch device of the first switching module, and the negative portion of the source voltage may be conducted through the first switch device of the second switching module.

BRIEF DESCRIPTION OF DRAWINGS

Other objects and advantages of the invention will become apparent upon reading the following detailed description and upon reference to the drawings in which:

FIG. 8 illustrates the internal components of a SCR module, such as those SCR modules shown in FIGS. 2, 3, 5, and 6; FIG. 8 also shows the gates of the individual SCRs within the SCR module coupled to gate terminals.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
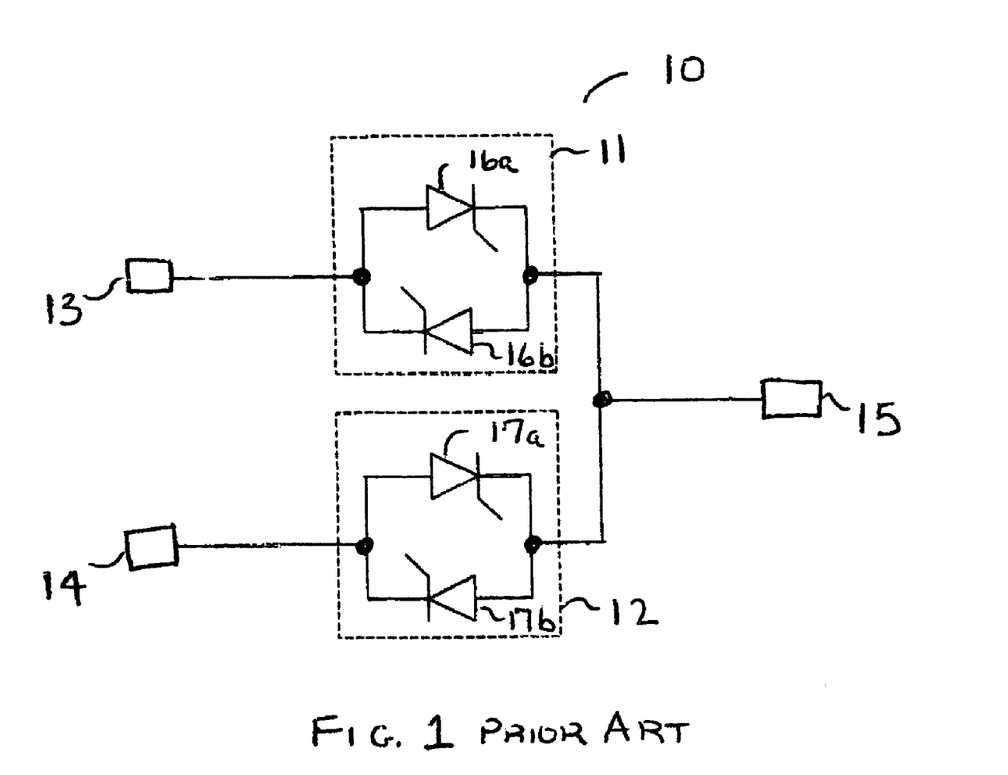
FIG. 1 illustrates a typical prior art static transfer switch ("STS") connection scheme.
Figure 2:
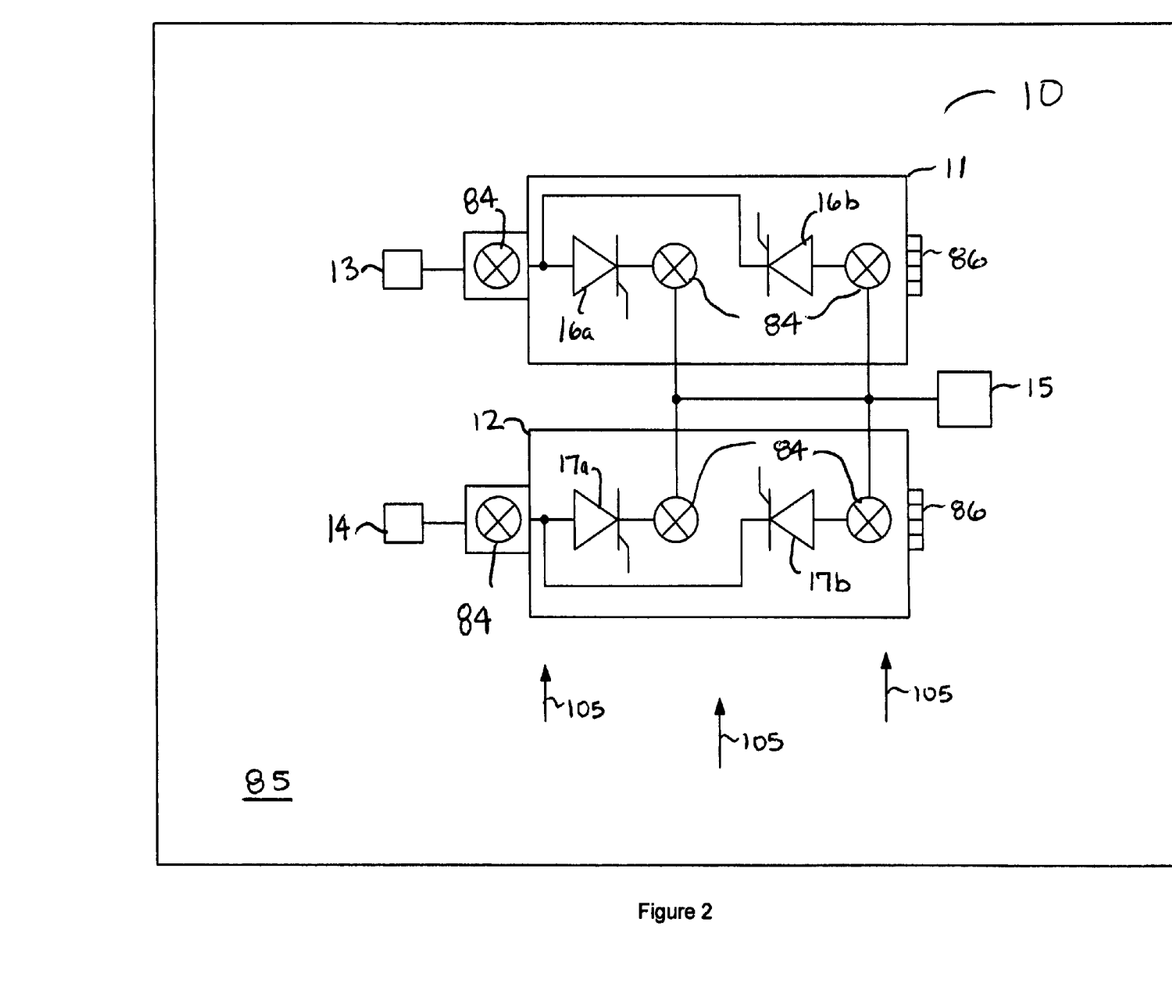
FIGS. 2 and 3 illustrate the typical prior art STS connection scheme shown in FIG. 1 mounted to a thermal interface.
Figure 3:
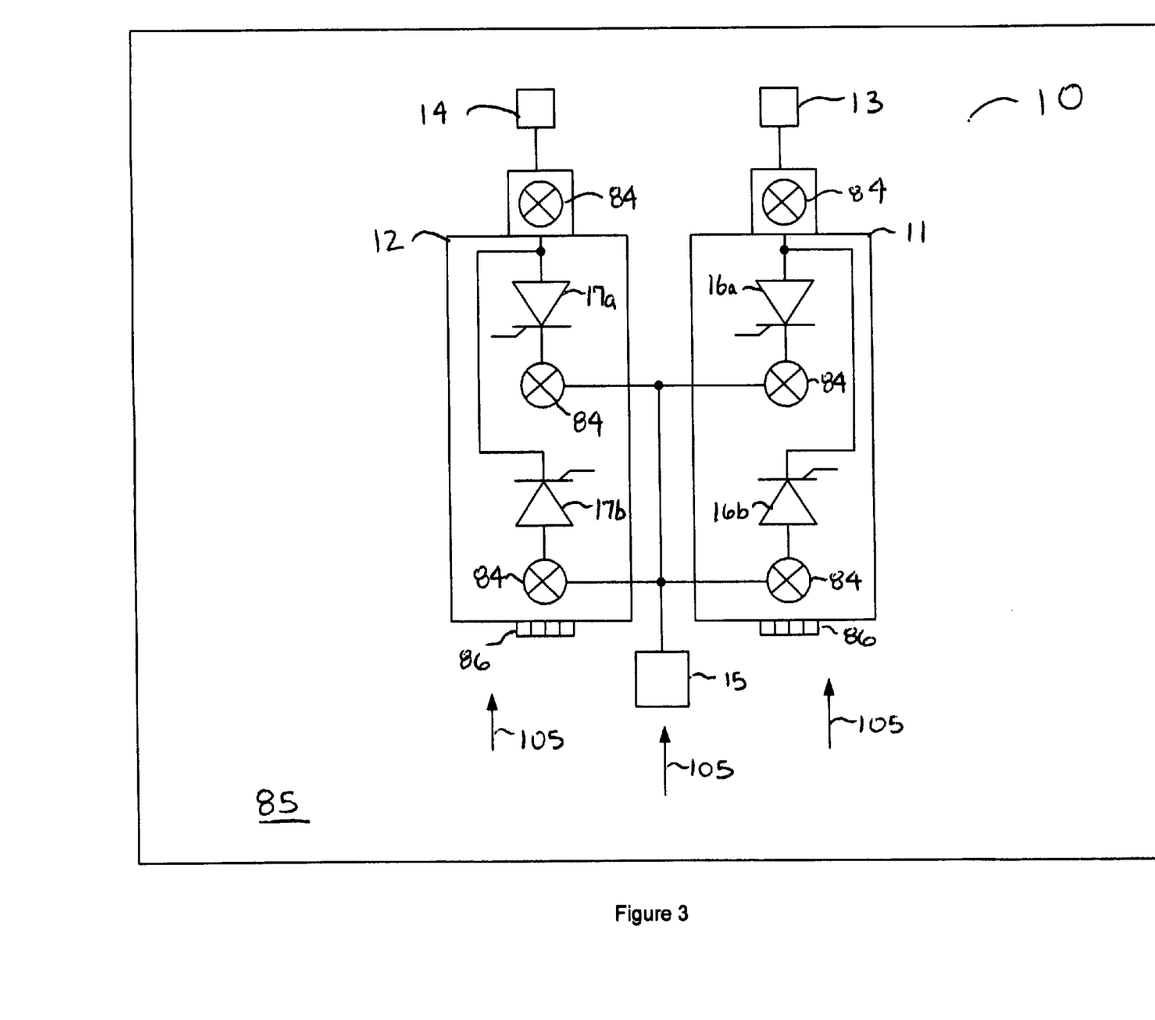

FIGS. 1, 2 and 3 illustrate a typical prior art static transfer switch ("STS") assembly 10 coupled to a first AC source at terminal 13 and a second AC source at terminal 14. STS assembly 10 includes first and second silicon controlled rectifier ("SCR") modules 11 and 12 respectively. STS assembly 10 is coupled to a load at terminal 15. First SCR module 11 includes a first SCR 16a and a second SCR 16b connected anti-parallel, (i.e. the anode of SCR 16a and cathode of SCR 16b are both coupled to the first AC source terminal 13). The cathode of SCR 16a and anode of SCR 16b are both coupled to the load terminal 15. Second SCR module 12 includes a first SCR 17a and a second SCR 17b similarly connecting the second AC source terminal 14 to the load terminal 15.

As shown in FIGS. 2 and 3, STS assembly 10 is mounted on a heat sink 85. Also shown are gate terminals 86, which are typically coupled to the gates of the SCRs, and terminations 84, which provide termination points for the power supplies and the load. The coupling of the gate terminals 86 to the gates of the SCRs is not shown in FIGS. 2 and 3 for clarity of the figures; however, referring to FIG. 8 a typical SCR module 110 is shown having the gates of SCRs 107a and 107b coupled to gate terminals 106. The SCR module 110 is an example of SCR modules 11 and 12 shown in FIGS. 2 and 3.

FIG. 2 illustrates prior art STS assembly 10 having the broadside of the SCR modules mounted parallel to the broadside of heat sink 85, whereas FIG. 3 illustrates STS assembly 10 having SCR modules 10 and 11 rotated 90° and mounted on the heat sink 85. The different mounting configurations of STS assembly 10 depicted in FIGS. 2 and 3, will be further discussed in reference to FIG. 7 below.

During operation the first AC source provides power to the load. During the positive half cycle SCR 16a conducts. During the negative half cycle SCR 16b conducts. The typical STS employs a controller and monitoring means, which can monitor the AC source current, AC source voltage, AC source frequency, and AC source phase angle. Based on some combination of the monitored values reaching a predetermined threshold value, the controller sends an output to the gates of SCRs 16a, 16b, 17a and 17b, to cause the individual SCRs to turn on and off.

In a typical configuration, the first AC source acts as the primary power source and the second AC source acts as an alternate or backup power source. Based on a monitored value trigger, such as loss of the primary AC source, the controller sends an output signal to the gates of SCRs 16a and 16b to turn off, and sends an output signal to the gates of SCRs 17a and 17b to turn on. During the positive half cycle of the second AC source coupled at terminal 14, SCR 17a conducts. During the negative half cycle of the second AC source at terminal 14, SCR 17b conducts.

A typical SCR module emits approximately 1 watt of heat energy per ampere flowing through the device. To dissipate the heat generated by an SCR module, a heat sink and/or cooling fans are typically used. The heat sinks typically used are aluminum and have fins to increase the surface area and dissipate the heat energy to the surrounding air. Failure to dissipate the heat generated by the SCR module is one of primary reasons for failure of SCR modules. During operation of a prior art STS assembly such as the STS assembly 10, because all of the current to the load is flowing through only one SCR module 11 or 12 at any given time, the total heat energy is generated by only one SCR module 11 or 12. Hence, the active SCR module 11 or 12 will become excessively hotter than the inactive SCR module 11 or 12. Although, the heat energy generated by an SCR module may partially dissipate to both the inactive SCR module and the heat sink, there is a need for improved thermal performance.

Figure 4:
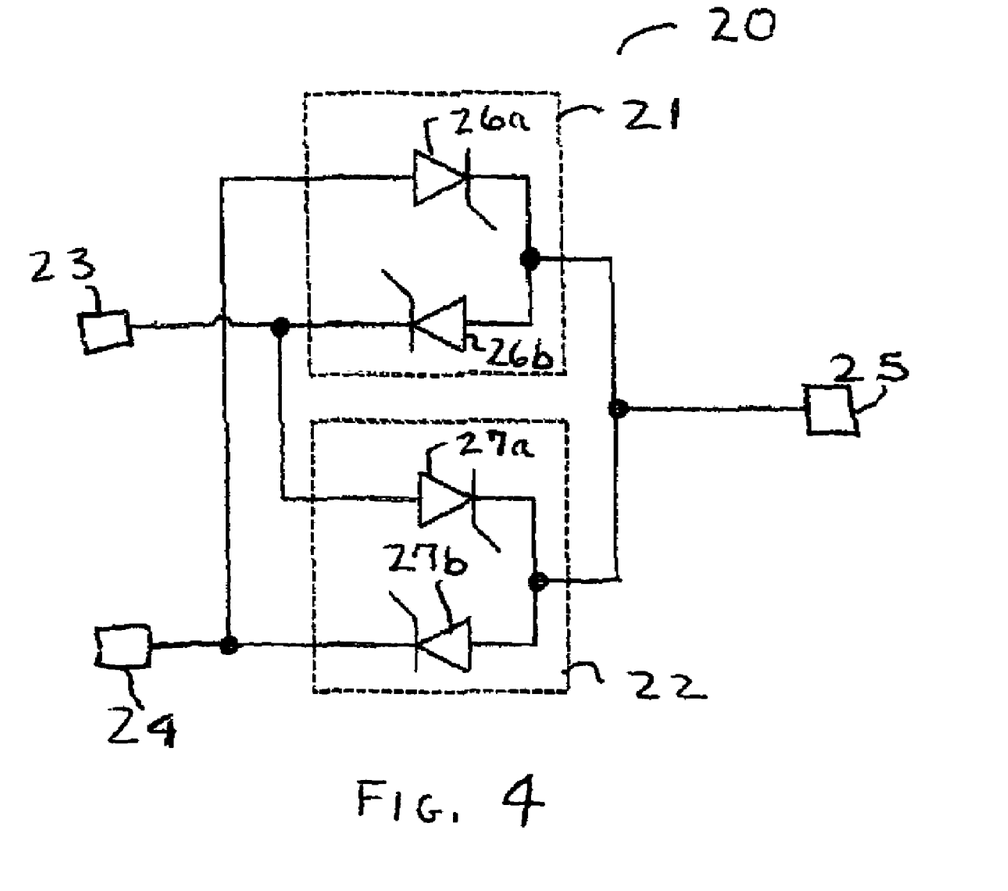
FIG. 4 illustrates a STS connection scheme having a switching apparatus of cross-coupled dual solid state switching devices in accordance with the present invention.
Figure 5:
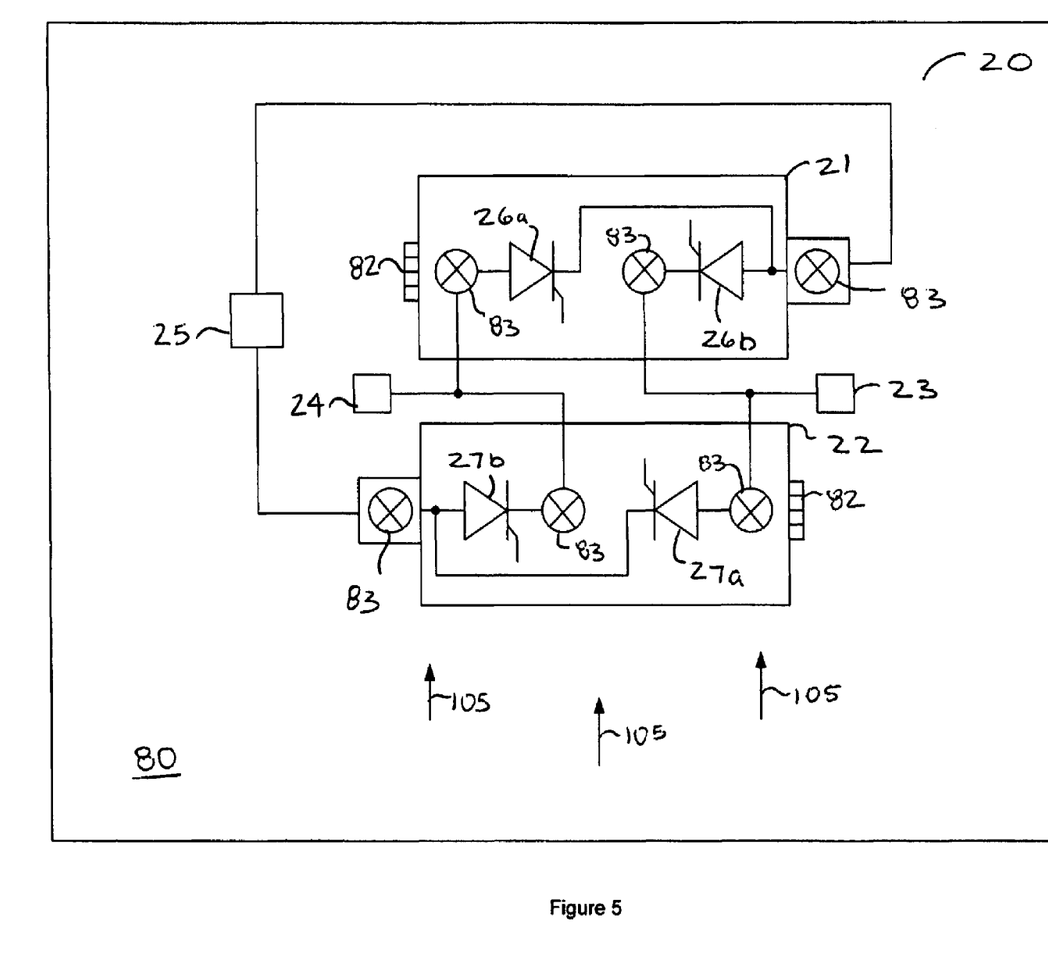
FIGS. 5 and 6 illustrate a switching apparatus of cross-coupled dual solid state switching devices in accordance with an embodiment of the present invention shown in FIG. 4 coupled to a thermal interface.
Figure 6:
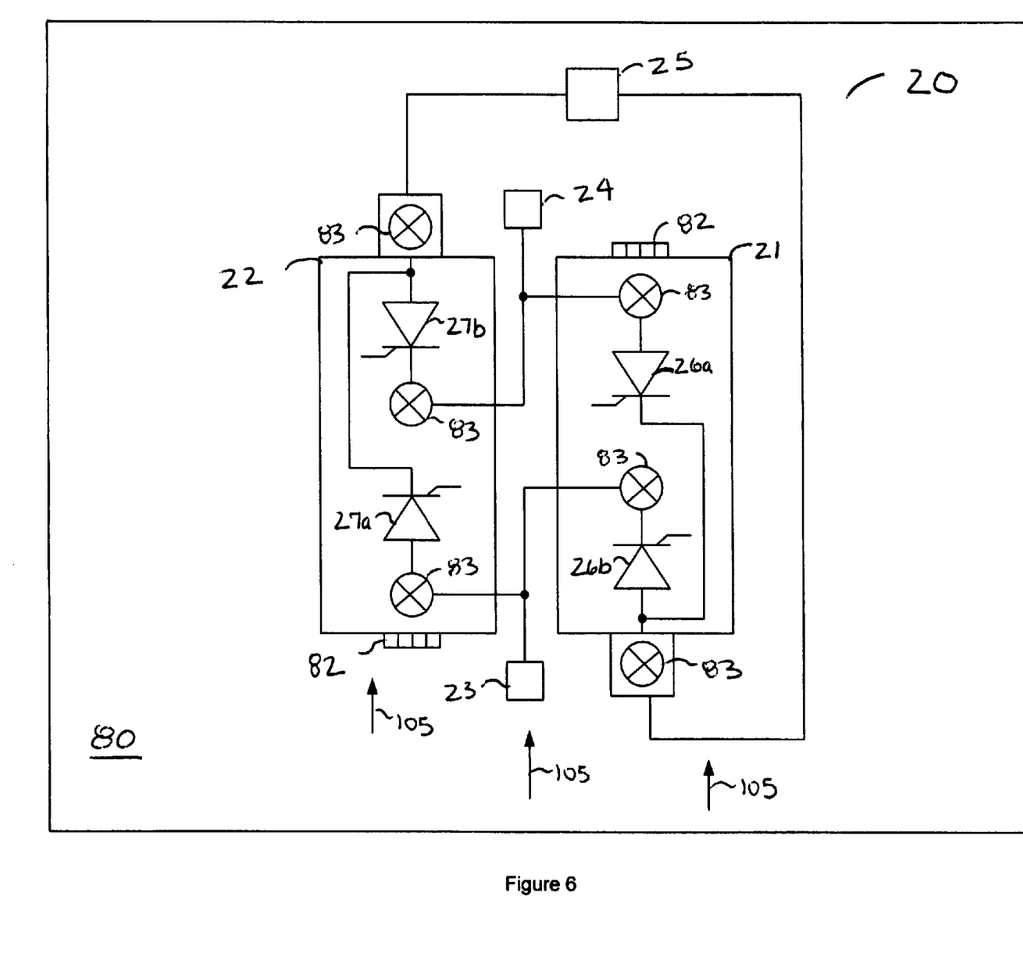

Turning to FIGS. 4, 5 and 6 an embodiment of an exemplary switching apparatus in accordance with aspects of the present invention shown schematically. An STS assembly 20 has a primary AC source at terminal 23 and a secondary AC source at terminal 24. STS assembly 20 includes first and second dual solid state switch devices, such as dual SCR modules 21 and 22, coupled to a load at terminal 25. First SCR module 21 includes a first SCR 26a and a second SCR 26b. Second SCR module 22 includes a first SCR 27a and a second SCR 27b. The first and second SCR modules 21 and 22 are coupled to a thermal interface 80, such as a heat sink, as shown in FIG. 5 and FIG. 6. The SCR modules 21 and 22 maybe be connected to the thermal interface 80 using compression bonding, reducing internal SCR module thermal failures caused by fatigue of solder bonds.

As shown in FIGS. 4, 5, and 6, the first and second SCR modules 21 and 22 are cross-coupled. The cathode of SCR 26b and anode of SCR 27a are both coupled to the primary AC source at terminal 23. The anode of SCR 26a and cathode of SCR 27b are both coupled to the secondary AC source at terminal 24. The cathode of SCR 26a, the anode SCR 26b, the cathode of SCR 27a, and the anode of SCR 27b are coupled to the load at terminal 25. Also shown in FIGS. 5 and 6 are gate terminals 82 and terminations 83. Gate terminals 82 are typically coupled to the gates of the individual SCRs 26a, 26b, 27a, and 27b and terminations 83 provide termination points for the power sources and the load. The coupling of the gate terminals 82 to the gates of the SCRs is not shown in FIGS. 5 and 6 for clarity of the figures; however, referring to FIG. 8 a typical SCR module 110 is shown having the gates of SCRs 107*a* and 107*b* coupled to gate terminals 106. The SCR module 110 is an example of SCR modules 21 and 22 shown in FIGS. 5 and 6. The different mounting configurations of STS assembly 20 depicted in FIGS. 5 and 6, will be further discussed in reference to FIG. 7 below.

A controller and monitoring apparatus monitors various parameters including the AC source current, AC source voltage, AC source frequency, AC source phase angle, the temperature of the thermal interface, the temperature of the individual SCR modules, failure of the electrical isolation between the thermal interface and the SCR modules, and/or the status of each individual SCR within the SCR modules (e.g. shorted or open SCRs). Based on any of the monitored values (or combination thereof) reaching a predetermined threshold value, the controller sends an appropriate output via terminals 82 to the gates of the appropriate individual SCRs turning off or turning on the SCRs. Depending on the switching apparatus' requirements, the SCRs can be gated for a whole or half cycle.

In the exemplary embodiment shown in FIGS. 4, 5 and 6, when either the primary or secondary AC source at terminals 23 or 24 is supplying power to the load at terminal 25 one SCR in each of the SCR modules is conducting during half of the duty cycle. For example, if the primary AC source at terminal 23 is supplying power to the load, during the positive half cycle SCR 27*a* conducts and during the negative half cycle SCR 26*b* conducts supplying current to the load. Because the duty cycle is split between the two SCR modules 21 and 22, the heat generated by the individual SCR modules 21 and 22 is significantly reduced as compared to prior art devices. Similarly, when the secondary AC source at terminal 24 is supplying power to the load, SCR 26*a* conducts during the positive half cycle and SCR 27*b* conducts during the negative half cycle, splitting the duty cycle between the two SCR modules 21 and 22 and reducing the heat generated by each of the SCR modules 21 and 22.

Figure 7:
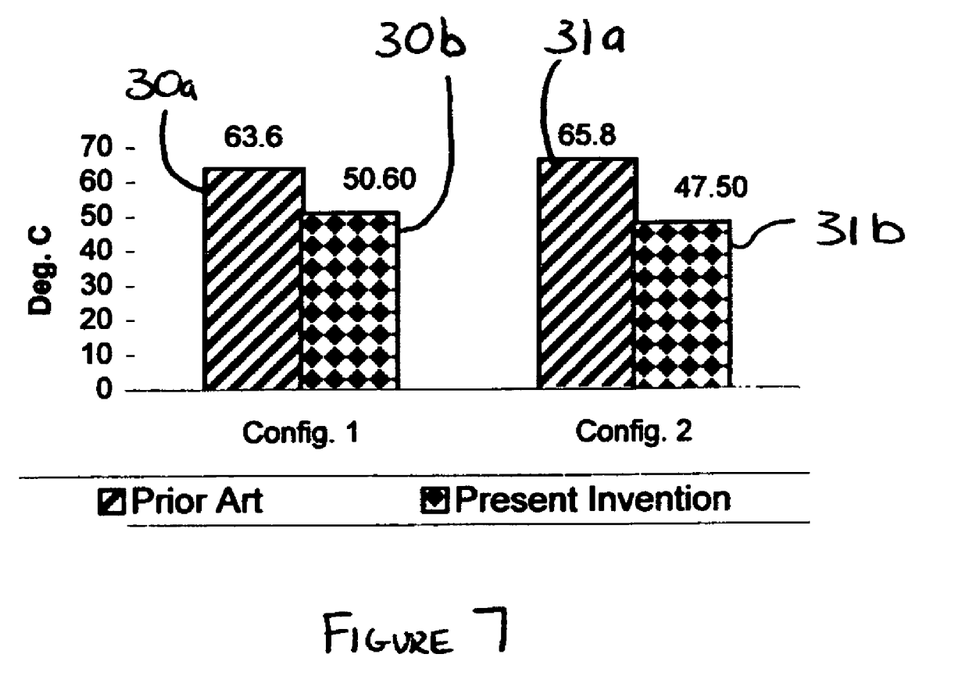
FIG. 7 illustrates a table showing the improved thermal performance of an STS having an embodiment of the present invention.

Using computational fluid dynamics software, a simulation of the thermal interface temperature rise for two configurations of multiple SCR modules mounted on a thermal interface (Configuration 1 and Configuration 2) was performed and the results are illustrated in FIG. 7. The simulation used two dual SCR modules in a single STS pole configuration. The temperature rises listed in FIG. 7 are in degrees Celsius.

Figure 8:
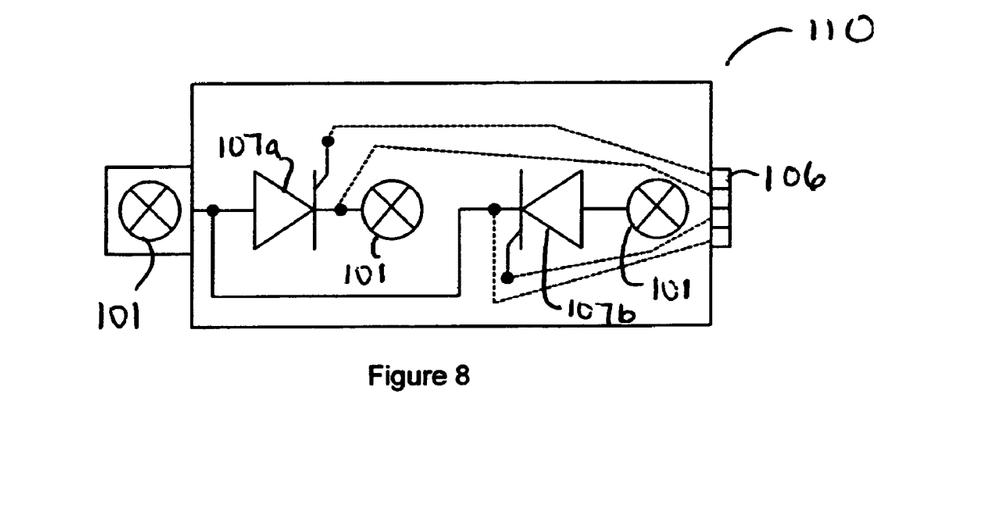

FIG. 8 illustrates an example of the internal components of SCR modules 11 and 12 shown in FIGS. 2 and 3, and the internal components of SCR modules 21 and 22 shown in FIGS. 5 and 6. For example, as shown in FIG. 8, SCR module 110 has individual SCRs 107*a* and 107*b*, terminations 101, and gate terminals 106. Individual SCRs 107*a* and 107*b* are equivalent to SCRs 16*a*, 16*b*, 17*a*, and 17*b* depicted in FIGS. 2 and 3; and are equivalent to SCRs 26*a*, 26*b*, 27*a*, and 27*b* depicted in FIGS. 5 and 6. Similarly, terminations 101 are equivalent to terminations 84 in FIGS. 2 and 3, and are also equivalent to terminations 83 in FIGS. 5 and 6. Likewise, gate terminals 106 are equivalent to gate terminals 86 in FIGS. 2 and 3, and are also equivalent to gate terminals 82 in FIGS. 5 and 6.

Figure 8A:
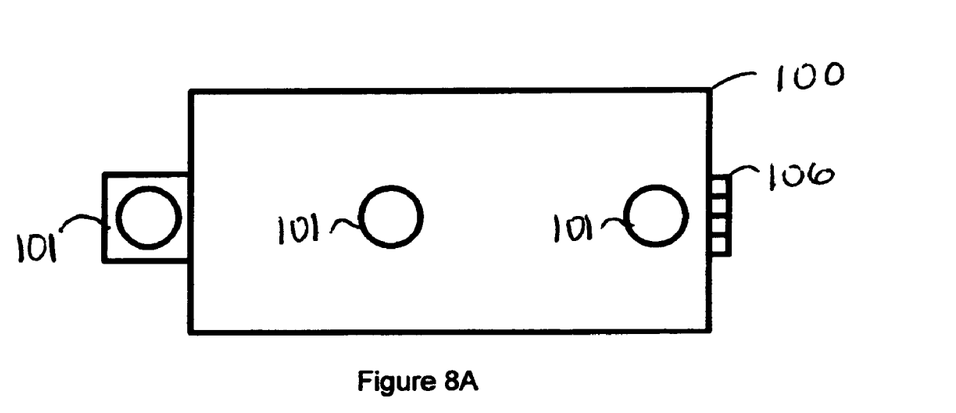
FIG. 8A illustrates a top view of the SCR module shown in FIG. 8 having a cover attached; the top view of the cover shown in FIG. 8A is also an example of a SCR module cover for the internal component view of the SCR modules shown in FIGS. 2, 3, 5, and 6.
Figure 8B:
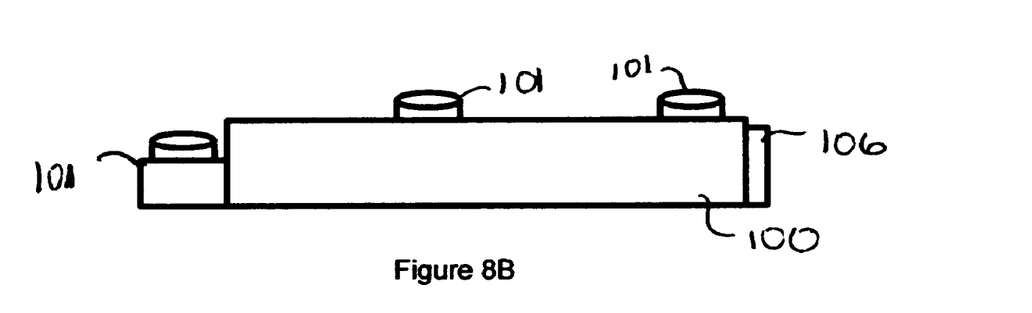
FIG. 8B illustrates a side view of the SCR module shown in FIGS. 8 & 8A having a cover attached; the side view of the cover shown in FIG. 8B is also an example of a SCR module cover for the internal component view of the SCR modules shown in FIGS. 2, 3, 5, and 6.

Turning to FIG. 8A, a top view of SCR module 110 shown in FIG. 8 having a cover 100 attached is illustrated. Terminations 101 and gate terminals 106 are also shown in FIG. 8A. Cover 100 encapsulates the internal components of SCR module 110. Cover 100 is also an example of a cover that can encapsulate SCR modules 11 and 12 of FIGS. 2 and 3, and SCR modules 21 and 22 of FIGS. 5 and 6. FIG. 8B illustrates a side view of SCR module 110 shown in FIGS. 8 and 8A having cover 100 attached. The side view also shows the terminations 101 and gate terminals 106.

Figure 9:
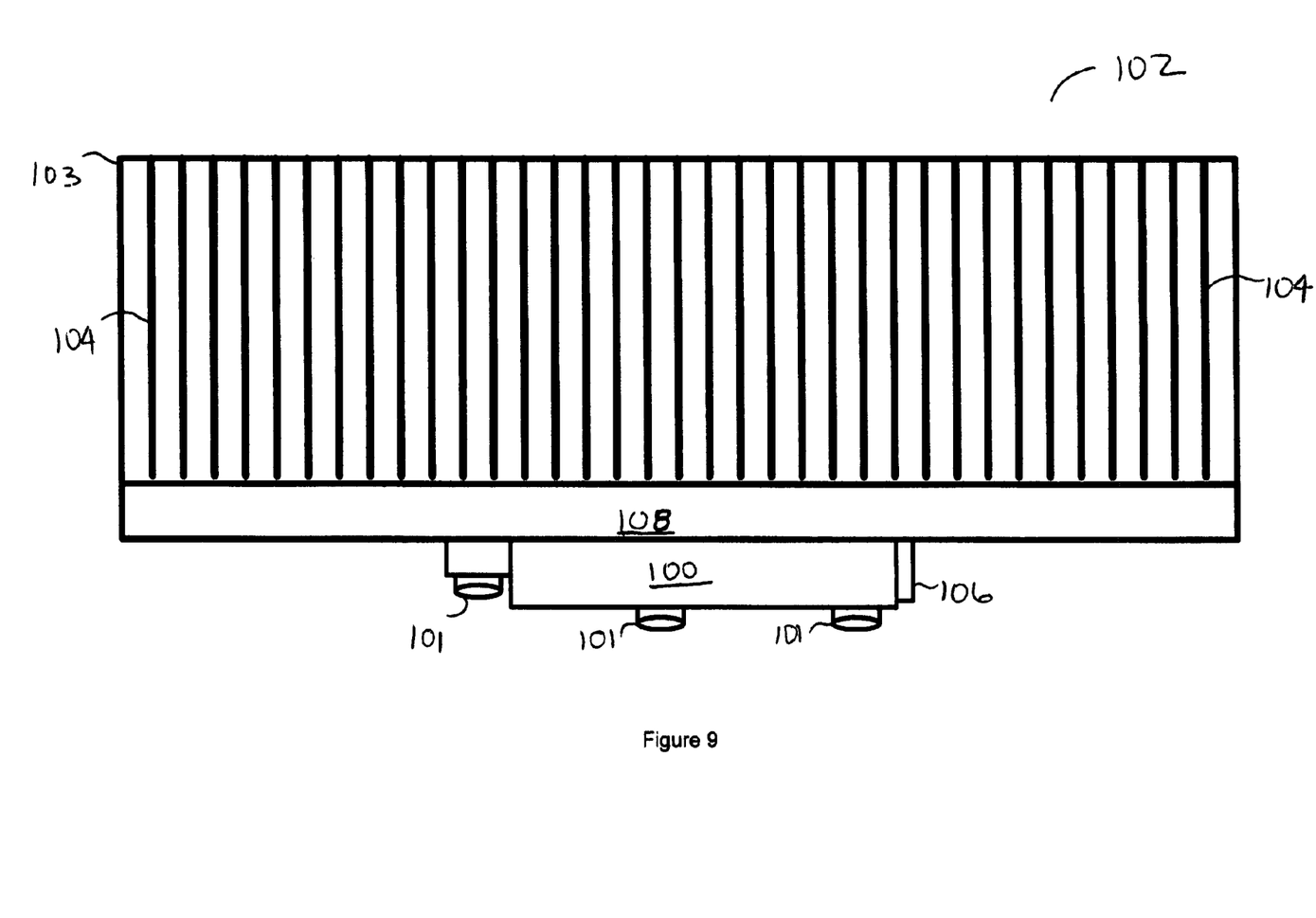
FIG. 9 illustrates a top view of a heat sink assembly having the STS assemblies shown in FIGS. 2 and 5 mounted thereto, showing the broadside of the SCR module.
Figure 10:
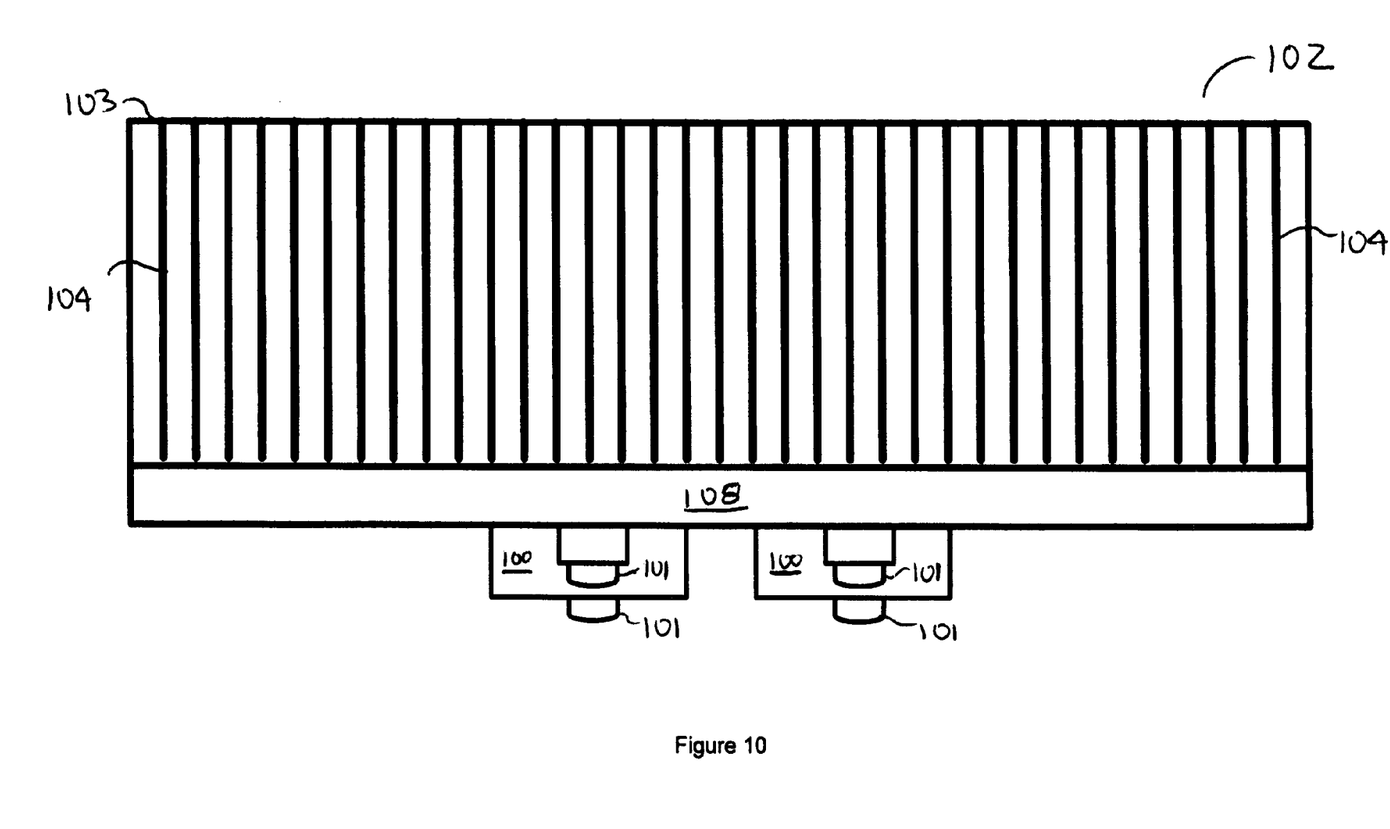
FIG. 10 illustrates a top view of a heat sink assembly having the STS assemblies shown in FIGS. 3 and 6 mounted thereto, showing the narrow side of the SCR modules.

Turning to FIGS. 9 and 10, top views of a heat sink assembly 102, having a shroud 103 surrounding a plurality of fins 104, with a heat sink 108 attached thereto. Gate terminals 86 for SCR modules 11 and 12 (FIG. 3), and gate terminals 82 for SCR modules 21 and 22 (FIG. 6) are illustrated in FIG. 9 as gate terminal connectors 106. In the simulation, the cooling system includes a fan that blows air across the SCR modules. The top views of heat sink assembly 102 as illustrated in FIGS. 9 and 10 are shown as if the fan is blowing air out of the drawing and into the reader's face. Heat sink 108 is illustrative of heat sink 85 shown in FIGS. 2 and 3 for prior art STS assembly 10. Heat sink 108 is also illustrative of thermal interface 80 shown in FIGS. 5 and 6 for STS assembly 20 having an embodiment of the present invention.

Configuration 1 as listed in FIG. 7 is the top view of heat sink assembly 102 shown in FIG. 9. Configuration 2 as listed in FIG. 7 is the top view of the heat sink assembly 102 shown in FIG. 10. As illustrated in FIGS. 9 and 10, coupled to the heat sink assembly 102 are the SCR modules having cover 100 attached thereto, along with terminations 101 and gate terminals 106 (FIG. 9).

Configuration 1 is illustrated in FIG. 2 for the prior art STS assembly 10, and is illustrated in FIG. 5 for STS assembly 20 having an embodiment of the present invention. As shown in FIG. 2 dual SCR modules 11 and 12 are immediately adjacent each another and mounted on heat sink 85. FIG. 2 is a bottom view of heat sink assembly 102 shown in FIG. 9, having SCR module cover 100, as shown in FIGS. 8A and 8B, mounted to SCR modules 11 and 12. As shown in FIG. 2 the broadside of SCR modules 11 and 12 is parallel with the broadside of heat sink 85. The arrows 105 shown in FIG. 2 indicate the direction of airflow across the broadside of SCR modules 11 and 12.

The value shown by shaded portion 30*a* in FIG. 7 indicates a heat sink 85 temperature rise for STS assembly 10 Configuration 1 of the prior art. In this Configuration 1, the primary AC source at terminal 13 is providing power to the load at terminal 15 and first SCR module 11 is conducting the entire duty cycle and the adjacent second SCR module 12 is not conducting. Using this prior art connection scheme and Configuration 1 as shown in FIG. 2, the simulation predicted a thermal interface 85 temperature rise of 63.6° C. as shown by the shaded value 30*a* for prior art STS assembly 10.

Turning to FIG. 5, Configuration 1 for STS assembly 20 is shown. As previously mentioned, the top view of heat sink assembly 102 as illustrated in FIG. 9 is shown as if the fan is blowing out of the illustration and into the reader's face. FIG. 5 is a bottom view of heat sink assembly 102 shown in FIG. 9, having SCR module cover 100, as depicted in FIGS. 8A and 8B, mounted to SCR modules 21 and 22. As shown in FIG. 5 dual SCR modules 21 and 22 are immediately adjacent each another and mounted on thermal interface 80. Also shown in FIG. 5, the broadside of SCR modules 21 and 22 is parallel with the broadside of heat sink 80. The arrows 105 shown in FIG. 5 indicate the direction of airflow across the broadside of SCR modules 21 and 22.

Referring to Configuration 1 for the cross-coupled connection scheme of the present invention depicted in FIG. 5, with each SCR module 21 and 22 splitting the duty cycle, the predicted temperature rise of thermal interface 80 was reduced to 50.6° C. The 50.6° C. value is shown by shaded portion 30b in FIG. 7. As shown in FIG. 7, using the cross-coupled connection scheme for Configuration 1 in accordance with the present invention, thermal interface 80 temperature rise is reduced by approximately 20%.

Also shown in FIG. 7 are the predicted thermal interface temperature rise values 31a, 31b for SCR modules mounted on a thermal interface having Configuration 2. Configuration 2 is shown in FIG. 3 for prior art STS assembly 10, and is shown in FIG. 6 for STS assembly 20 having an embodiment of the present invention. As shown in FIG. 3, STS assembly 10 has SCR modules 11 and 12 rotated 90° in relation to their placement depicted in FIG. 2. Similarly, as shown in FIG. 6, STS assembly 20 has SCR modules 21 and 22 also rotated 90° in relation to their placement depicted in FIG. 5.

A top view of heat sink assembly 102 having Configuration 2 is shown in FIG. 10. FIG. 10 illustrates the SCR modules have module cover 100, as shown in FIGS. 8A and 8B, mounted thereto. As previously mentioned, the top view of heat sink assembly 102 as shown in FIG. 10 is depicted as if a cooling fan, used to cool the SCR modules, is blowing into your face. FIG. 3 is a bottom view of heat sink assembly 102 shown in FIG. 10. In FIG. 3, the internal components of SCR modules 11 and 12 are shown, whereas FIG. 10 illustrates the SCR modules 11 and 12 having module cover 100 attached. As illustrated in FIG. 3, the narrow side of SCR modules 11 and 12 is parallel with the broadside of heat sink 85. The airflow arrows 105 represent the direction of the airflow across the narrow side of SCR modules 11 and 12.

Referring back to FIG. 7, the 65.8° C. value shown by shaded portion 31a indicates a predicted heat sink 85 temperature rise for STS assembly 10 Configuration 2 of the prior art as shown in FIG. 3. In Configuration 2 depicted in FIG. 3, the primary AC source at terminal 13 is providing power to the load at terminal 15, first SCR module 11 is conducting the full duty cycle, and second SCR module 12 is not conducting; both SCR modules 11 and 12 are mounted to heat sink 85. Using this prior art connection scheme and the Configuration 2 as shown in FIGS. 3 and 10, the simulation predicted a heat sink 85 temperature rise of 65.8° C. as shown by the shaded value 31a in FIG. 7.

Turning now to FIG. 6, Configuration 2 for STS assembly 20 having an embodiment of the present invention is shown. As previously mentioned, the top view of heat sink assembly 102 as illustrated in FIG. 10 depicts SCR modules 21 and 22 shown in FIG. 6 having cover 100 attached. FIG. 6 is a bottom view of heat sink assembly 102 shown in FIG. 10 that depicts the internal components of SCR modules 21 and 22. As shown in FIG. 6, the narrow side of SCR modules 21 and 22 is parallel to the broadside of thermal interface 80. The airflow arrows 105 show the air flowing across the narrow side of SCR modules 21 and 22.

Referring to FIG. 6, using the same Configuration 2 and the cross-coupled connection scheme of an embodiment of the present invention, with each SCR module 21 and 22 splitting the duty cycle, the predicted temperature rise of thermal interface 80 was reduced to 47.5° C. as shown by the shaded value 31b in FIG. 7. Using the cross-coupled connection scheme for Configuration 2 in accordance with the present invention, the thermal interface 80 temperature rise is reduced by over 27%. The results illustrated in FIG. 7 are for a specific heat sink, SCR modules, load and power supply configuration; therefore, depending on these dynamic characteristics the results could vary.

Based on the simulation results shown in FIG. 7, a comparison between the optimal configurations for both STS assembly 20 having an embodiment of the present invention and prior art STS assembly 10 is useful. For prior art STS assembly 10, Configuration 1 (i.e. the airflow flows across the broadside of the SCR modules 11 and 12), which resulted in a heat sink 85 temperature rise of 63.6° C., is the optimal configuration. For STS assembly 20 having an embodiment of the present invention, Configuration 2 (i.e. the airflow flows across the narrow side of SCR modules 21 and 22), which resulted in a thermal interface 80 temperature rise of 47.50° C., is the optimal configuration. Hence, using the optimal configurations for both prior art STS assembly 10 and STS assembly 20 having an embodiment of the present invention, using STS assembly 20 resulted in a greater than 25% drop in the thermal interface temperature rise.

Figure 11:
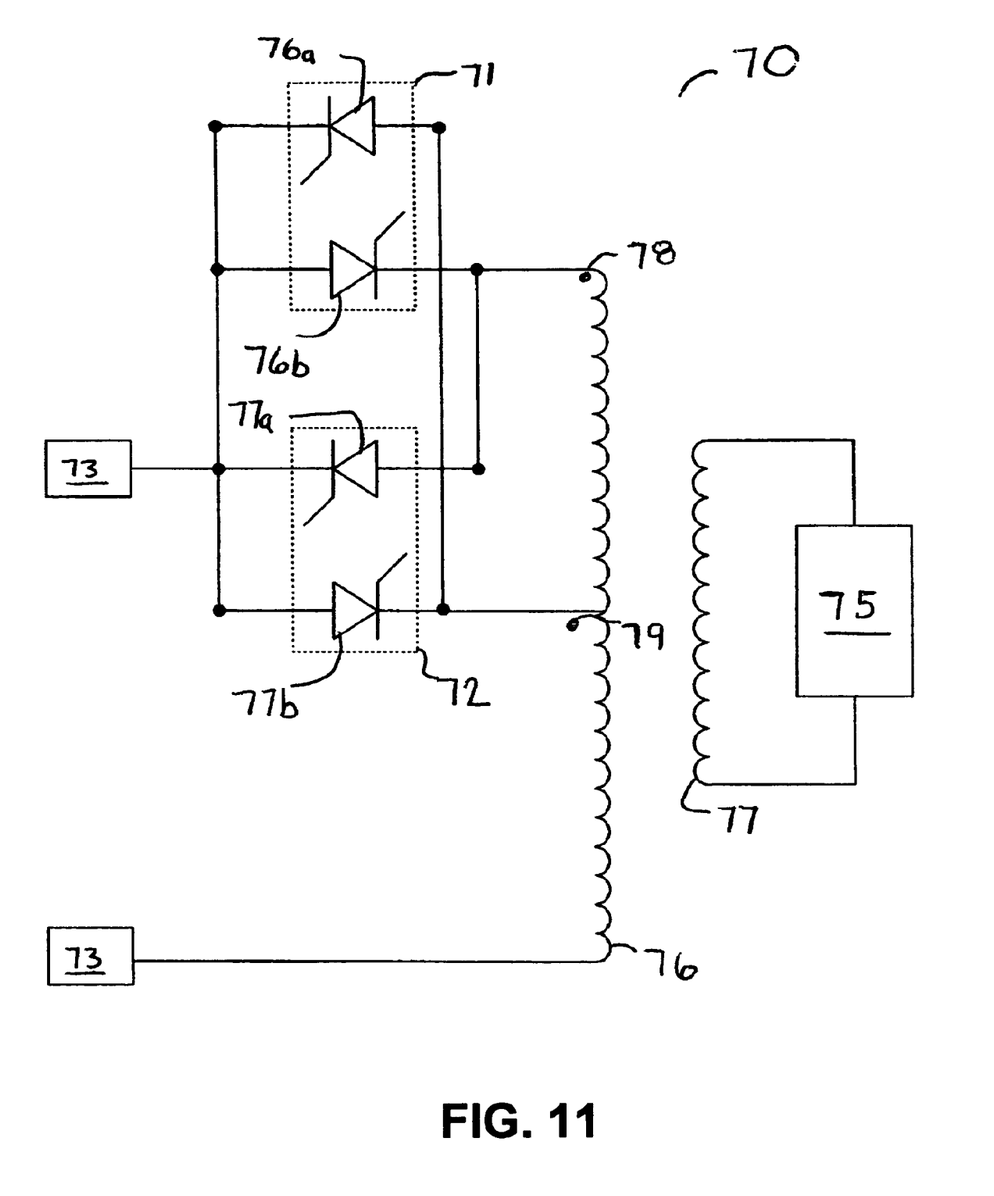
FIG. 11 illustrates a transformer tap switcher connection scheme having a switching apparatus of cross-coupled dual solid state switching devices in accordance with an embodiment of the present invention.

Although the switching apparatus of the present invention has been described for use in a STS, other embodiments of the present the switching apparatus of the present invention include its use in any electrical device that has idle interconnected current paths, such as static volt-ampere-reactive compensators ("SVAR") and transformer tap switchers. An embodiment of the switching apparatus of the present invention used in a transformer tap switcher is illustrated in FIG. 11. The switch position of transformer tap switcher 70 depends on the load 75 requirement. Tap switcher 70 includes a primary winding 76 coupled to a voltage source at terminals 73, and a secondary winding 77 coupled to load 75. The tap switcher also includes dual SCR module 71 having SCRs 76a and 76b, and dual SCR module 72 having SCRs 77a and 77b.

The various tap positions represent various transformer turn ratios, which equates to various voltage outputs. For example, as shown in FIG. 11 the first transformer tap 78 is coupled to SCR 76b of SCR module 71 and is coupled to SCR 77a of SCR module 72. Similarly, the second transformer tap 79 is coupled to SCR 76a of SCR module 71 and SCR 77b of SCR module 72. During operation, if the first transformer tap 78 position is chosen to supply power to the load 75, the positive portion of the duty cycle is conducted through SCR 76b of SCR module 71 and the negative portion is conducted through SCR 77a of SCR module 72. Similarly, if the second transformer tap 79 is chosen to assist in supplying power to load 75, the positive portion of the duty cycle is conducted through SCR 77b of SCR module 72 and the negative portion is conducted through SCR 76a of SCR module 71.

Figure 12:
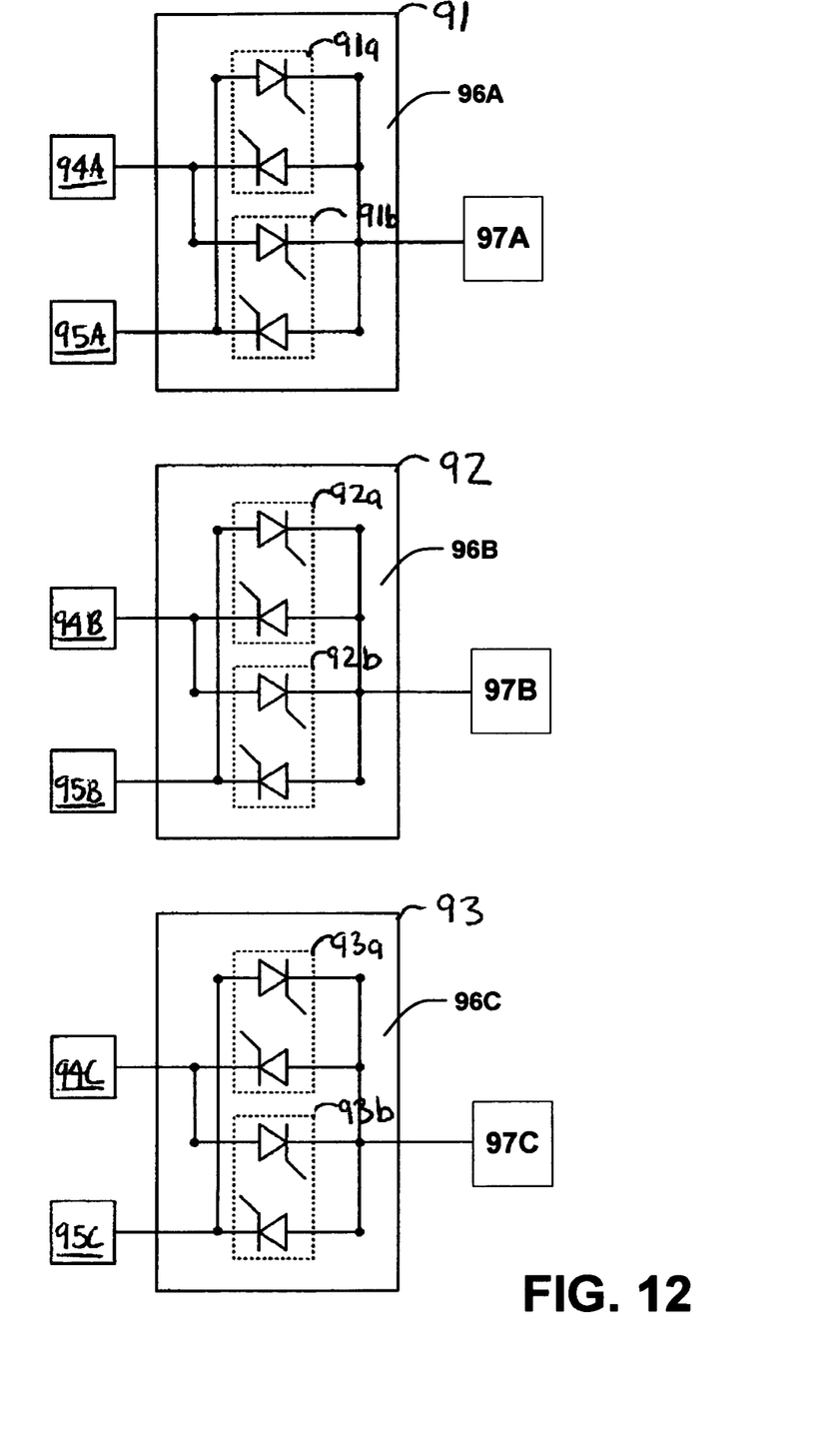
FIG. 12 illustrates a switching apparatus of an embodiment of the present invention for use in a three-phase system.

As described and illustrated previously, only a single-phase configuration was shown. However, the switching device disclosed herein is applicable to multi-phase operation. FIG. 12 shows an exemplary switching arrangement for three-phase operation. An STS assembly 90 has three sets of switch assemblies 91, 92 and 93. The first switch assembly 91 has SCR modules 91a and 91b, the second switch assembly 92 has SCR modules 92a and 92b, and the third switch assembly 93 has SCR modules 93a and 93b. The SCR modules for each of the respective switch assemblies 91, 92, 93 are connected to a common heat sink 96A, 96B and 96C. For example, switch modules 91a and 91b of switch assembly 91 are both connected to heat sink 96A. As shown in FIG. 12, the three-phase primary AC source is connected at terminals 94A, 94B and 94C, and the three-phase secondary AC source is connected at terminals 95A, 95B and 95C. Each of the switch assemblies 91, 92, 93 includes an output terminal 97A, 97B and 97C, respectively. The operation of the STS assembly 90 is as previously described herein. The duty cycle of each phase being split between individual SCRs located in differing SCR modules to distribute the heat generated across a larger portion of the heat sinks 96A, 96B and 96C.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A switch assembly, comprising:
    a heat sink;
    a first switch module connected to the heat sink, the first switch module having first and second switch devices, each switch device having a gate terminal;
    a second switch module connected to the heat sink, the second switch module having first and second switch devices, each switch device having a gate terminal;
    a first power source input terminal connected to a cathode terminal of the second switching device of the first switch module and an anode terminal of the first switching device of the second switch module; and
    an output terminal connected to an anode terminal of the second switching device of the first switch module and a cathode terminal of the first switching device of the second switch module;
    wherein the gate terminals of the switching devices are controllable such that the first switch module conducts during a first portion of the power duty cycle and the second switch module conducts during a second portion of the power duty cycle.

2. The switch assembly of claim 1, further comprising a second power source input terminal connected to an anode terminal of the first switching device of the first switch module and a cathode terminal of the second switching device of the second switch module.

3. The switch assembly of claim 1, wherein the first and second switch modules are connected to the heat sink via a compression bond.

4. The switch assembly of claim 1, wherein the switch devices comprise SCRs.

5. A method of operating switching modules coupled to a common heat sink, each of the switching modules having first and second switch devices, the method comprising:
    applying a source voltage to the switching modules;
    conducting a positive portion of the source voltage through the second switch device of the first switching module; and
    conducting a negative portion of the source voltage through the first switch device of the second switching module.

6. The method of claim 5, further comprising applying a second source voltage to the switching modules.

* * * * *